G. GABET.
HEATING SYSTEM.
APPLICATION FILED DEC. 10, 1919.

Patented July 11, 1922.

Inventor
G. Gabet,
By H. R. Keralake,
Atty

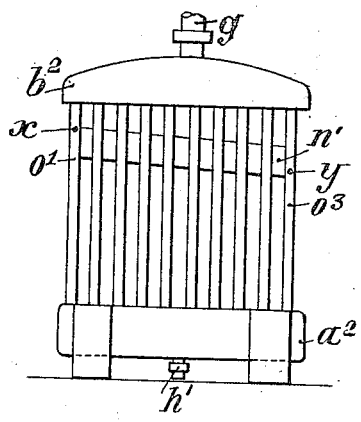
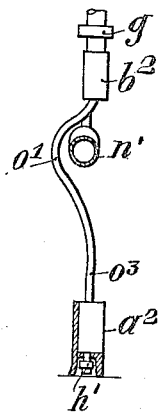
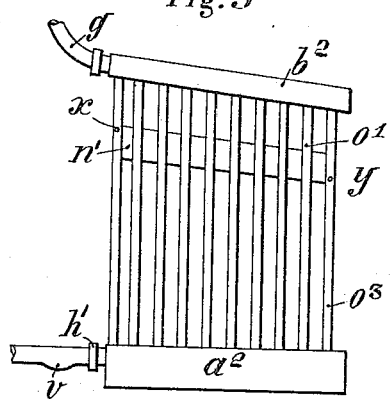
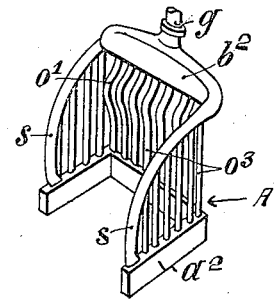
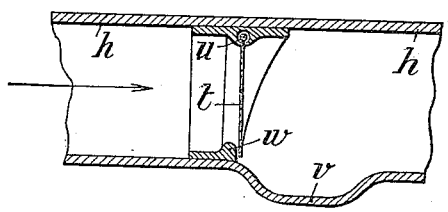

UNITED STATES PATENT OFFICE.

GUSTAVE GABET, OF PARIS, FRANCE.

HEATING SYSTEM.

1,422,556.    Specification of Letters Patent.    Patented July 11, 1922.

Application filed December 10, 1919. Serial No. 343,700.

*To all whom it may concern:*

Be it known that I, GUSTAVE GABET, a citizen of the French Republic, and resident of 30$^{bis}$ Boulevard Jourdan, Paris, France, have invented certain new and useful Improvements in Heating Systems, of which the following is a specification.

Heating by means of a fire place or hearth and a chimney, is universally considered to be the most agreeable and healthiest method of heating or warming extant, but this method entails a considerable wastage of heat.

Present systems of heating buildings and apartments by means of hot water, steam or vapor, which utilize small boilers placed in the kitchen, kitchen ranges or other special means present the disadvantage of high initial cost of installation and the discomfort arising from the non visibility of a fire and the want of aeration of the room due to lack of a draught through a chimney. Further, in the kitchen a torrid heat generally exists and the calories thus radiated to the detriment of the heating circuit further diminish the hydrometic force.

The present invention has for its object to provide a heating apparatus which has the advantage of heating by an open fire in communication with a chimney and central heating without appreciable calorific loss, the calories lost in the usual chimney method being actually recovered. From the thermal point of view, considerable economy over existing methods is realized, whilst maintaining the aeration and comfort of a visible fire in the main chamber. My construction permits using pipes of a minimum section as well as disposition of the feed and return pipes on the floor level, which allows of the piping arrangement being concealed for example under the plinths.

The invention consists essentially in placing at the bottom of the chimney, a metallic reservoir or vessel of special form, which forms a low pressure boiler, that feeds a hot water circuit acting as a thermo-syphon for the heating surfaces or radiators situated in the adjacent apartments on the same floor or other floors of the apartment or building.

The general arrangement of the apparatus may be varied without departing from the nature of the invention and the apparatus may be completed by a decorative expansion pipe capable of being fixed on the outer wall of a chimney without destroying the aesthetic effect.

Figures 1 and 2 shew a section and an elevation respectively of a chimney provided with a reservoir type of boiler and with a decorative expansion pipe specially suitable for this particular application of the boiler.

Figure 3 shews a front view of a modified form of boiler suitable for all kinds of fire-places.

Figure 4 is a side view partly in section.

Figure 5 is a front view of a modified form of boiler.

Figure 6 is a perspective view of the boiler shown in Figs. 1 and 2.

Figure 7 drawn to an enlarged scale shews a sectional detail view of a flap valve designed to be disposed at the inlet to the boiler.

Figure 1:
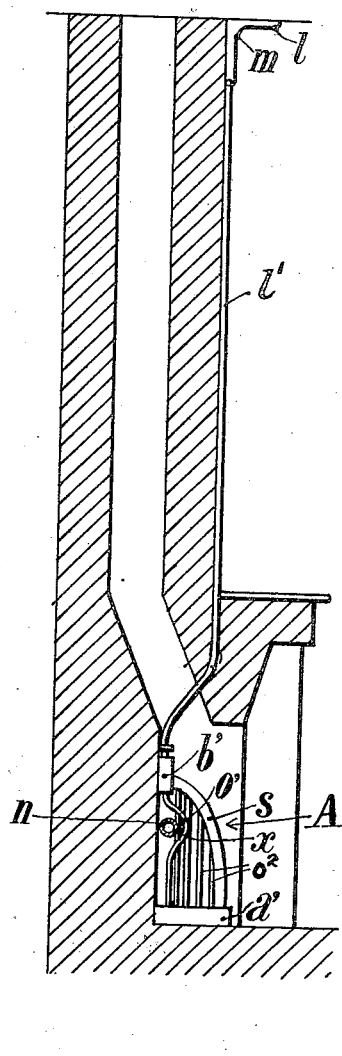
Figure 2:
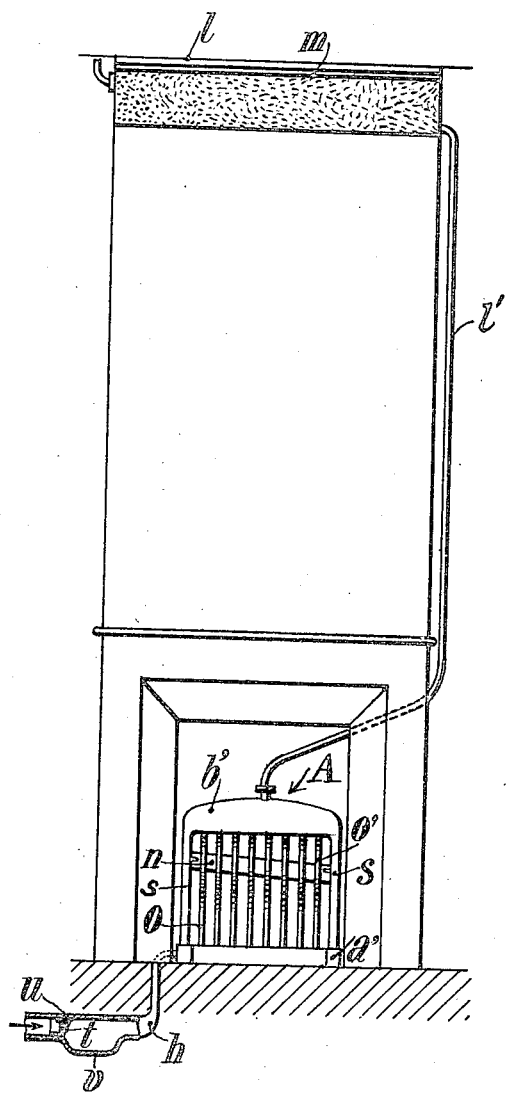

Referring to the drawings the construtional form shewn by way example in Figures 1 and 2 comprises a metallic receptacle A adapted to be fixed in the fire-place opening of a chimney, and in the present instance including a hollow U-shaped bottom portion $a'$, a hollow top portion $b'$ and hollow lateral extensions $s$ which place the interiors of the upper and lower portions in communication. A series of vertical pipes $o$ are arranged between the rear portion of the member $a'$ and the member $b'$ through which water is adapted to circulate from the lower to the upper member. A suitable grate (not shown) is to be placed between the side extensions $s$ and the fire placed on this grate heats the water within the boiler. As shown, the pipes $o$ are preferably bulged or curved outwardly as shown at $o'$ so that the fire on the grate will contact with the bulged portions on its way to the chimney.

Vertical pipes $o^2$ extend from the ends of the member $a'$ to the member $s$ and water from the lower member is adapted to pass through these pipes to the side members $s$.

An inclined pipe or chamber $n$ is arranged behind the bulged portions $o'$ and has its ends connected to the rear pipes of the series of pipes $o^2$ and the water is also adapted to circulate through this pipe $n$.

The member $a'$ is provided with an inlet or feeding pipe $h$ having a pivoted flat valve arranged within the same and functioning to facilitate the pulsations without preventing thermo-syphonic action. Said valve is shown in large in Figure 7 and it is preferably formed of a light vertical damper $t$ pivoted on a hinge $u$ and swinging freely from the tube $h$ so as to offer very little resistance to incoming water. The resistance of the damper will be very little for a displacement of small amplitude corresponding to the thermo-siphonic action. A pocket $v$ situated at the lower part of the tube $h$ is provided to accentuate this advantage while permitting the passage of a large quantity of liquid for a slight displacement of the damper or valve $t$.

The arrangement may be carried out in any suitable or convenient manner and especially by means of a small frame or suitable form carrying a valve seat $w$ which also acts as a stop interposed in the inlet tube $h$.

The vessel A may be fixed by any suitable means at the bottom of the chimney against the vertical back wall thereof and for this reason it may be adapted to any type of existing chimney.

The arrangement of the heating surfaces is analogous to that of existing systems in private houses, the expansion pipe suitably rendered nonconductive being situated in the attic or at the top of the house. But it may be specially desirable to place the expansion pipe in the apartment itself. For this purpose the expansion pipe may be made in the form of a flattened angular chamber $l$ with a bulged portion $m$, the main dimension of which will be for example that of the width of the chimney, and in this form it will lend itself to decorative effects when placed thus on the chimney, will not detract from the æsthetic appearance of the apartment.

This chamber $l$ is connected by a pipe $l'$ to the boiler A. Chimney heating only utilizes the heat produced by radiation that is to say 6 to 12 per cent of the calories contained in the fuel. By the present apparatus it may be assumed that half of the remaining calories are recovered giving a useful calorific effect of about 50 per cent as compared to 10 per cent in existing systems.

In the constructional forms shewn by way of example in Figures 3 to 5 the boiler is formed of two horizontal portions $a^2$ $b^2$ connected together by vertical tubes $o^3$ having their upper part bulged in a similar manner to the parts $o'$ of Figures 1 and 2.

The lower part $a^2$ is provided with a coupling $h'$ for the inlet pipe, for example below this part in such manner as to diminish as much as possible the available depth of the fire. The upper part $b^2$ carries the outlet tube $g$. If so desired the space behind the bulged part $o'$ of the tubes $o^3$ may be utilized to house a slightly inclined tube $n'$ connected to each of the end tubes and forming a boiler tube, coupled to the end tubes at the points $x$ and $y$.

The inlet and outlet pipes may be arranged at one side as shewn in Figure 5. The bulged part $o'$ of the vertical tubes $o$ $o^3$ is always used.

In the constructional form using lateral projecting cheeks, the lower horizontal part $a'$ is formed by an arched or curved tube or other member according to the shape of the fireplace and connected to the upper part $b'$ by arched or curved tubes $s$, to which are connected the vertical straight tubes $o^2$ mounted on the lower part $a'$ and forming the lateral cheeks of the vessel.

The apparatus is particularly designed for villas, detached and semi-detached houses.

The boiler is preferably constructed of copper to avoid the pyritic oils or other impurities attacking the metal, but it should be understood that the material as well as the dimensions and details of construction may be varied without departing from the nature of the invention.

Having now particularly described and ascertained the nature of my said invention and in what manner the same is to be performed, I declare that what I claim is:

1. In a central heating system, the combination with a chimney having an open fireplace, a chamber placed at the lower part of the fireplace, a chamber placed at the upper part, vertical tubes connecting the two chambers, the upper part of said tubes being bulged outwardly and a substantially horizontal tube placed in the concavity formed by the bulged portions of the tubes and connected to certain of said pipes.

2. In a central heating system, the combination with a chimney having an open fireplace, a chamber placed at the lower part of the fireplace, a chamber placed at the upper part, vertical tubes connecting the two chambers, the upper part of said tubes being bulged outwardly, a substantially horizontal tube placed in the concavity formed by the bulged portions of the tubes and connected to certain of the pipes, and the lower chamber being of U-shaped.

3. In a central heating system, the combination with a chimney having an open fireplace, of a U-shaped chamber placed at the lower part of the fireplace, a chamber placed at the upper part, vertical tubes connecting the two chambers, the upper part of said tubes being bulged outwardly, a substantially horizontal tube placed in the concavity formed by the bulged portions of the tubes and connected to certain of said pipes, lateral tubes connecting the ends of the lower chamber to those of the upper chamber, and a series of vertical tubes connecting the lateral tubes and the lower chamber.

4. In a central heating system, the combination with a chimney having an open fireplace, a U-shaped chamber placed at the lower part of the fireplace, a chamber placed at the upper part, vertical tubes connecting the two chambers, the upper part of said tubes being bulged outwardly, a substantially horizontal tube placed in the concavity formed by the bulged portions of the tubes and connected to the upper chamber, lateral tubes connecting the ends of the lower chamber to those of the upper chamber, a series of vertical tubes forming a means of communication between said lateral tubes and the lower chamber, an inlet pipe, a check valve arranged in the inlet pipe, and an expansion extension on said inlet pipe arranged adjacent to said valve.

5. In a central heating system, the combination with a chimney having an open fireplace, of a lower U-shaped chamber, an upper chamber, vertical tubes connecting them, the upper part of said tubes being bulged outwardly, a substantially horizontal tube placed in the concavity formed by the bulged portions of said pipes and connected to certain of said pipes, lateral tubes connecting the ends of the lower chamber to those of the upper chamber, a series of vertical tubes forming means of communication between said lateral tubes and the lower chamber, a water inlet pipe, a flap valve in the water inlet pipe, and an angular radiator placed at the intersection of the chimney and the ceiling.

In testimony whereof I have signed my name to this specification.

GUSTAVE GABET.